United States Patent [19]

Nunez

[11] Patent Number: 5,337,933
[45] Date of Patent: Aug. 16, 1994

[54] CONVERTIBLE ARTICLE CARRIER

[76] Inventor: Raul Nunez, Calle 4, #120, Villamar Isla Verda, P.R. 00979

[21] Appl. No.: 2,899

[22] Filed: Jan. 11, 1993

[51] Int. Cl.⁵ ............................................. A45C 9/00
[52] U.S. Cl. .................................... 224/151; 224/224; 224/904
[58] Field of Search ............... 224/151, 904, 907, 224, 224/228, 240; 190/1, 903

[56] References Cited

U.S. PATENT DOCUMENTS

| | | |
|---|---|---|
| D. 238,725 | 2/1976 | Zerobnick . |
| 1,992,772 | 2/1935 | Ross ................................ 224/151 |
| 3,976,113 | 8/1976 | Kim . |
| 4,126,213 | 11/1978 | McDonald ........................ 190/903 |
| 4,545,414 | 10/1985 | Baum .................................. 224/224 |
| 4,826,059 | 5/1989 | Bosch et al. ....................... 224/907 |
| 4,942,948 | 7/1990 | Vickers ............................. 190/1 X |
| 4,984,906 | 1/1991 | Little . |
| 4,991,245 | 2/1991 | Franco ............................. 190/1 X |
| 5,150,824 | 9/1992 | Alvarez et al. ...................... 224/151 |
| 5,201,448 | 4/1993 | Schue .................................. 224/904 |

*Primary Examiner*—Renee S. Luebke

[57] ABSTRACT

The device is a multipurpose carrier having the necessary assembly structure for use by electricians, carpenters, telecommunication installers, fisherman, etc. The multipurpose carrier may be selectively folded to form a tote bag or an apron having a therapeutic device. The bag may be equipped with segregated compartments for an assortment of tools and a plurality of access openings for the user. The tote bag is quickly convertible to an apron, by simple unzipping operations, without the necessity of removing the tools therein. The apron includes a therapeutical belt that may be used to support the lower back muscles of the user to help prevent the strains associated with physically demanding jobs.

13 Claims, 6 Drawing Sheets

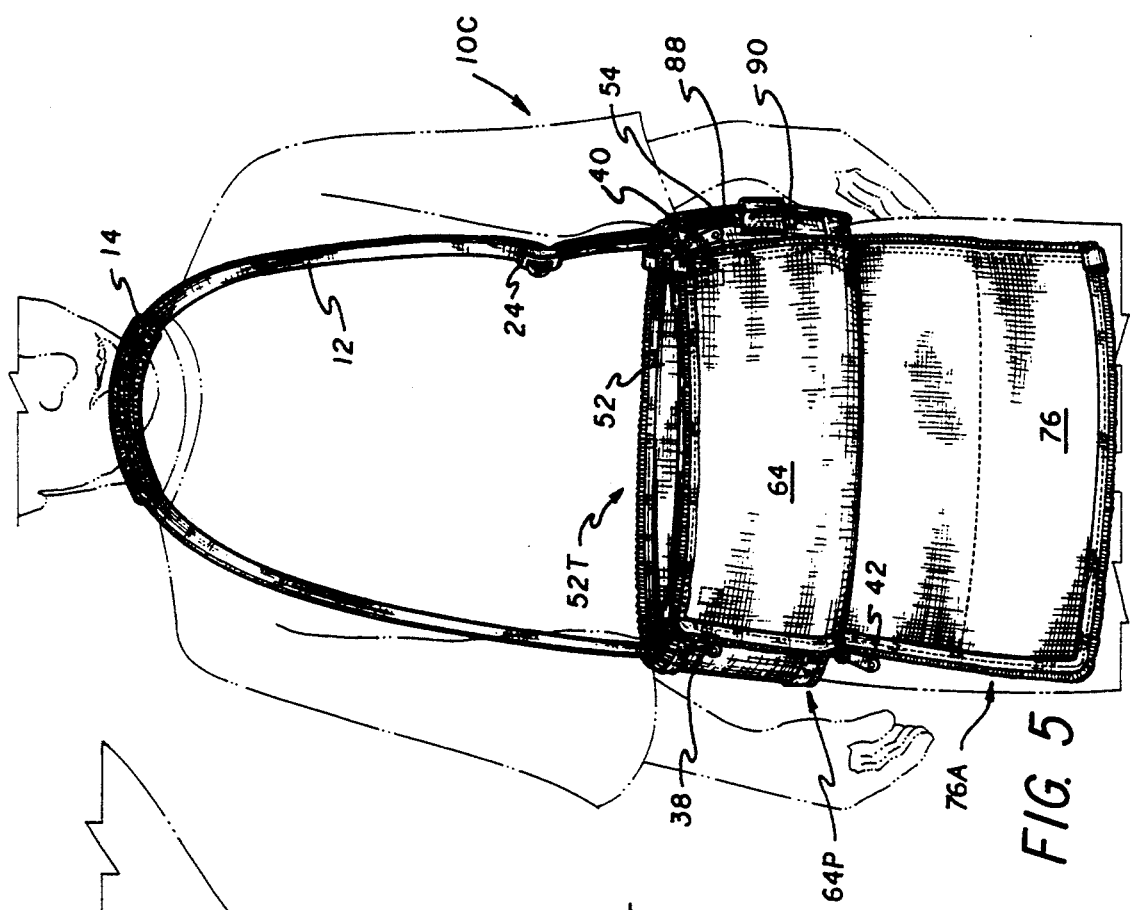
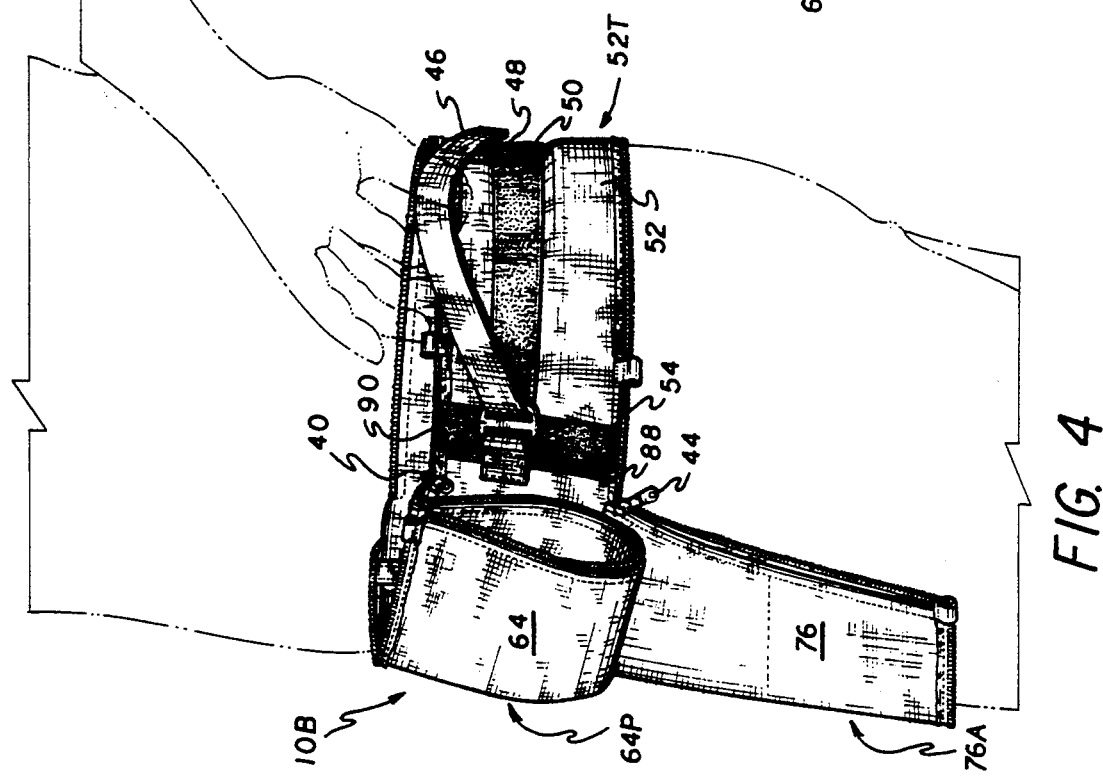

CONVERTIBLE ARTICLE CARRIER

BACKGROUND OF THE INVENTION

This invention relates to new and useful improvements in convertible article carriers. More particularly, the invention relates to an article carrier which may be converted from a multipurpose tote bag to an article-carrying apron having a therapeutic belt.

DESCRIPTION OF THE PRIOR ART

The prior art reveals a number of receptacles for holding and carrying articles, such as professional tools and the like. In as far as tools are concerned, the most common types of receptacles are, perhaps, the metal tool boxes used by mechanics, the canvas tool bags used by telecommunication technicians, and the leather aprons preferred by carpenters and electricians. Although these receptacles have been the preferred forms of tool carriers for most journeymen, they possess certain characteristic disadvantages and inconveniences that render them unsatisfactory.

For example, the popular mechanic's tool boxes do not have the means to separately hold and store tools therein. Tools are simply placed within a main recess making the retrieval thereof a frustrating and time-consuming task especially if a particular tool may be located amidst a plurality of cluttered up tools. Tool bags and kits may have segregated compartments that facilitate access to specific tools but, like tool boxes, their bulkiness and construction imperatively necessitates shorter handles for carrying the same by hand thus preventing the free use of both hands.

In view of these disadvantages, it would be a significant advancement in the art to provide an article carrier that holds articles in an efficiently organized and independently accessible manner. It would be another advancement to provide a tote bag that can be easily transformed into an apron which can readily be worn around the waist without removing the article therein. It would be a still further advancement for such an apron to include a firmly padded, therapeutic, back support device for people engaged in physically demanding jobs.

U.S. Pat. No. 3,976,113 issued Aug. 24, 1976 to Whan Jong Kim is most relevant to the present invention in terms of its cross-like configuration and zipper attachments. It has four zippered corners and four rectangular, vertical side panels joined edge to edge when in the assembled form. However, it includes no rectangular lid flap, apron configuration or a therapeutic device.

U.S. Pat. No. 4,984,906 issued Jan. 15, 1991 to Vickie A. Little et al. shows a multipurpose utility tote that has peripheral zipper attachments and lateral flaps that become vertical side panels of a tote bag. The tote bag is convertible into a flat, cushioned surface resembling the configuration of the letter "T". It does not transform into an apron or include a therapeutic device.

In U.S. Pat. No. 1,992,772 issued Feb. 26, 1935 to C. A. Ross a beach blanket is disclosed which, by a simple folding and tying operation, can be transformed into a carrying bag and by other folding methods can be configured into an apron. It does not transform into a back brace or support, however, and neither the bag nor the apron configuration is intended to act as a receptacle for articles such as professional tools and the like.

U.S. Pat. No. 4,991,245 issued Feb. 12, 1991 to Jack Franco shows a portable lounge pillow of a fabric or plastic material that is convertible to and from a tote bag for carrying articles. A compartmentalized interior and pockets are included to increase carrying capacity for such items as combs, eye goggles, towels and other personal grooming articles. It is not transformable to, say, a construction type apron for carrying tools associated with this trade.

Other prior art disclosures are even more remote. U.S. Design Pat. No. D-238,725 issued Feb. 10, 1976 to Alan H. Zerobnick shows a belt pack comprising a detachable pocket segment. A zipper defines the opening to the pocket segments, and the belt has a fastening means to hold it around the wearer's torso, however, it is not a therapeutic device.

As can be seen, the prior art fails to disclose a tote bag that is convertible to an apron, adaptable for holding and carrying tools in both the bag and apron configuration, and provides a therapeutic device in the form of a belt. None of the above inventions and patents, taken either singly or in combination, are seen to describe the instant invention as claimed.

SUMMARY OF THE INVENTION

This present invention eliminates the characteristic disadvantages of present article carriers, such as tool bags, tool boxes and aprons, by offering expediency and convenience in its use. Simply stated the invention is a multipurpose, convertible article characterized in that it is:

a multipurpose tote bag—whose interior is adapted for carrying and storing articles, such as but not limited to mechanical tools, electronic and telecommunication tools, and carpentry and electrical tools, and for providing a plurality of access means to the tools;

an apron—for conveniently and securely disposing articles within reach of a user with no apprehension of accidental detachment of articles; and a therapeutic belt—comfortably padded to support and protect the back of the user from muscular strains associated with physically demanding jobs.

Accordingly, it is a principal object of the invention to provide a convertible article carrier that is essentially a tote bag convertible to an apron having a belt that functions as a therapeutic device.

It is another object of the invention to provide a convertible tote bag with a plurality of access means to the interior.

Another object of the invention is to provide a tote bag that has a padded shoulder strap as a carrying means which allows free use of the hands.

It is a further object of this invention to provide an apron that prevents an accidental detachment of the articles carried thereby.

It is a still further object of the invention to provide a therapeutic device in the form of a belt that may be used in conjunction with an apron.

These and other objects of the present invention will become readily apparent upon further review of the following specification and claims, reference being made to the accompanying drawings forming a part of the specification, wherein like reference numbers designate corresponding parts in the several views.

BRIEF DESCRIPTION OF THE DRAWINGS

FIG. 4 is an environmental side elevational view of the present invention in the form of an apron having and open end pocket and a therapeutic belt.

FIG. 5 is an environmental front elevational view of the present invention in the form of an apron having and open end pocket, a therapeutic belt, and a shoulder strap.

DETAILED DESCRIPTION OF THE PREFERRED EMBODIMENTS

Figure 1:
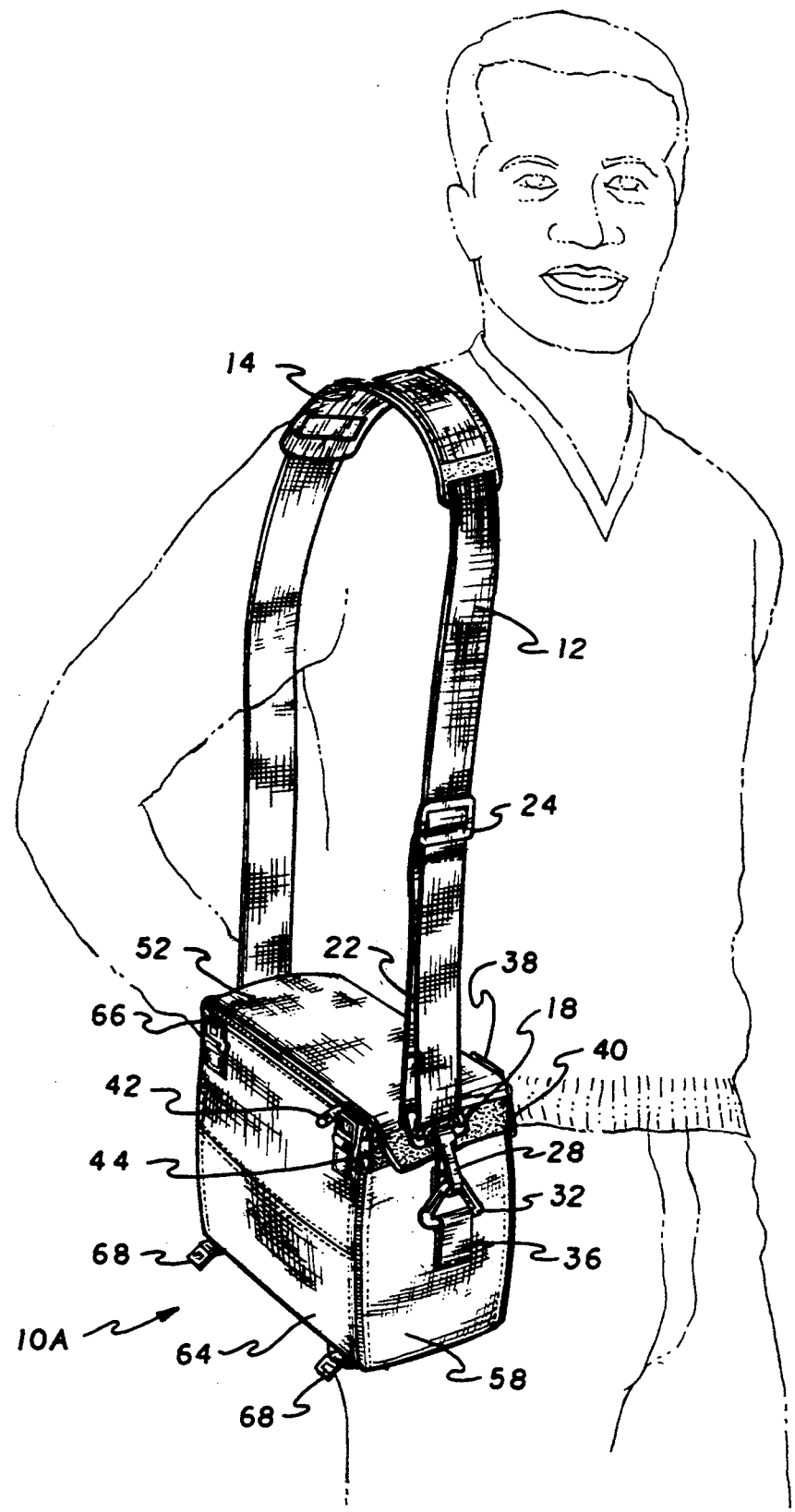
FIG. 1 is an environmental perspective view of the present invention in the form of a tote bag.
Figure 3:
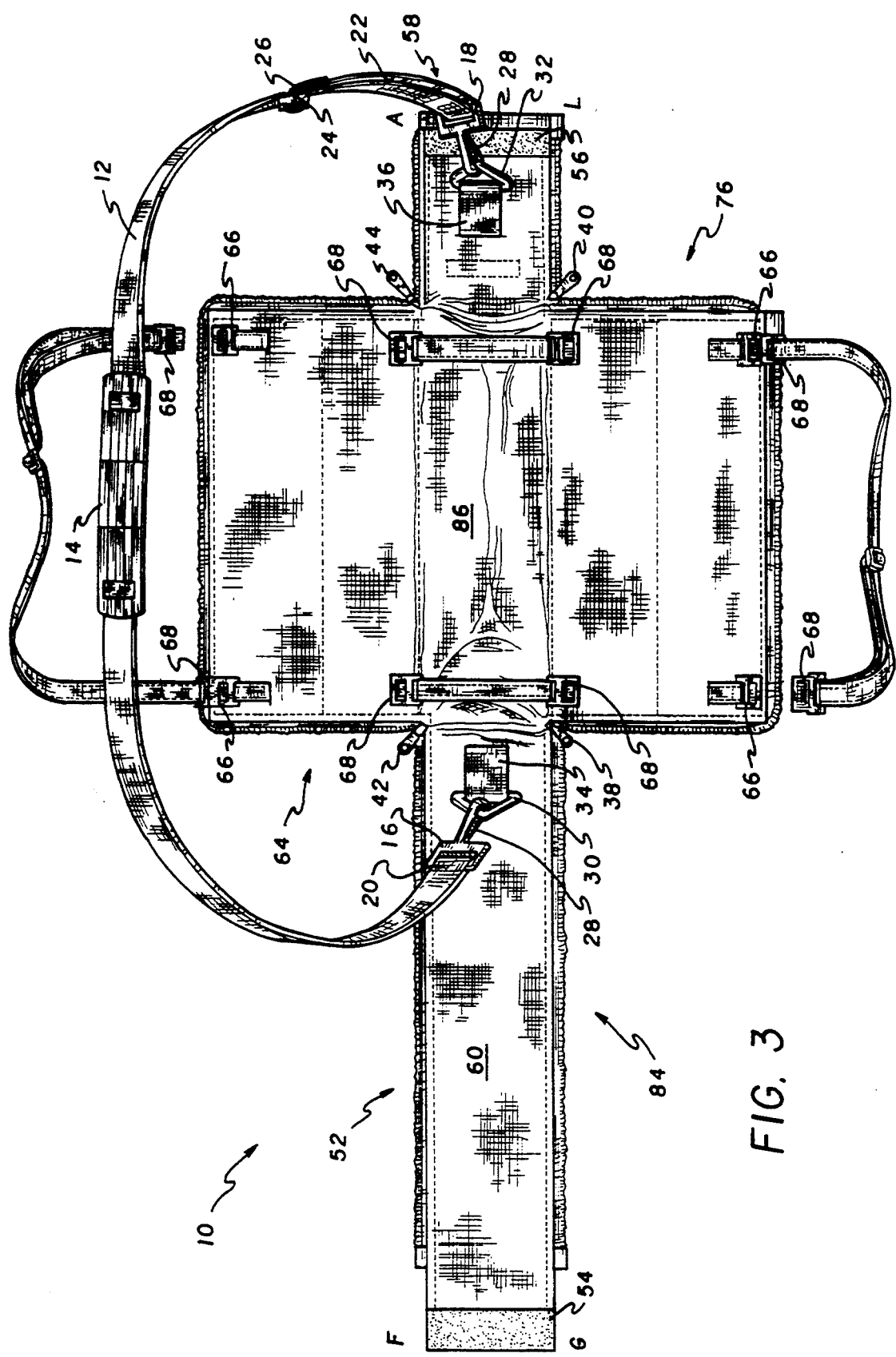
FIG. 3 is a bottom plan view of the tote bag shown in FIG. 1 in an open position.

Referring firstly to FIG. 1, the convertible article carrier 10 of the present invention is illustrated in FIG. 1 showing the tote bag 10A. The tote bag 10A is shown in its normal carrying position, suspended from a person's shoulder by means of a shoulder strap 12. The shoulder strap 12 is provided with a short slidable padding 14 that prevents direct contact between the strap 12 and the shoulder of the user and helps absorb the pressure exerted on the shoulder by the weight of the bag 10A and the articles contained therein. Attached to each end of the shoulder strap 12 is a rectangular buckle 16,18 which constitutes the first of two attachment means that tether the tote bag 10A to the shoulder strap 12. The buckles 16,18 may be made of hard plastic or any suitable material of sufficient strength to withstand the maximum weight of the bag 10A and contents. At the rear of the tote bag 10A (shown in FIG. 3), a first end of the shoulder strap 12 is inserted into a first rectangular buckle 16 and then folded back on itself forming a first loop 20 trapping the buckle 16 therein. The loop 20 is stitched closed securing the buckle 16 therein. At the front end of the bag 10A a second end of the shoulder strap 12 which is inserted into and through the second rectangular buckle 18 and also folded back into itself to form a second loop 22. The second end is further folded about the center cross-member (not shown) of an adjustable buckle 24 forming a third loop 26 and is stitched to retain the cross-member within the third loop 26. The second loop 22 has a variable size dependent on the adjustment of the adjustable buckle 24. Retainer hooks 28 are carried by the first and second buckles 16,18 and are attachable to triangular buckles 30,32 attached to both the rear and front (shown also in FIG. 3) of the tote bag 10A via closed loops 34,36.

Four zippers, have pull tabs 38,40,42,44 which terminate at the two upper forward corners of the tote bag 10A. By unzipping the zippers associated with pull tabs 38,40,42,44 completely, the tote bag 10A may be completely unfolded into the open position shown in FIGS. 2 and 3. The entire peripheral structure of the convertible article carrier 10 and part of the necessary attachments thereof give rise to the tote bag 10A in FIG. 1 and the apron configurations 10B,10C in FIGS. 4,5 and 6. To attain the tote bag 10A configuration shown in FIG. 1, the belt strip 46 (shown in FIG. 2), which is lined with the hook portion 48 of a first matingly engagable hook and loop-type fastener, is folded back and brought into registry with the loop strip 50 of the first hook and loop-type fastener that is stitched along the inside of the lid flap 52. The lid flap 52 is now lifted, tilted forward, bringing a hook portion 54 of a second hook and loop-type fastener (stitched inside the lid flap 52) to make contact with a corresponding loop strip 56 of the fastener sewn along the side AL of the outside edge of the front rectangular flap 58 (shown in FIG. 3). The lid flap 52 is stiff to provide support yet padded to offer comfort. The stiffness is achieved through the insertion of a layer of stiff rubber substance or the like disposed between external and internal material layers 60,62 of the lid flap 52 to provide the necessary firmness for a therapeutic back-support 52T. The peripheral zippers 38,40,42,44 along the peripheral edges may be closed to form the tote bag 10A shown in FIG. 1.

Figure 6:
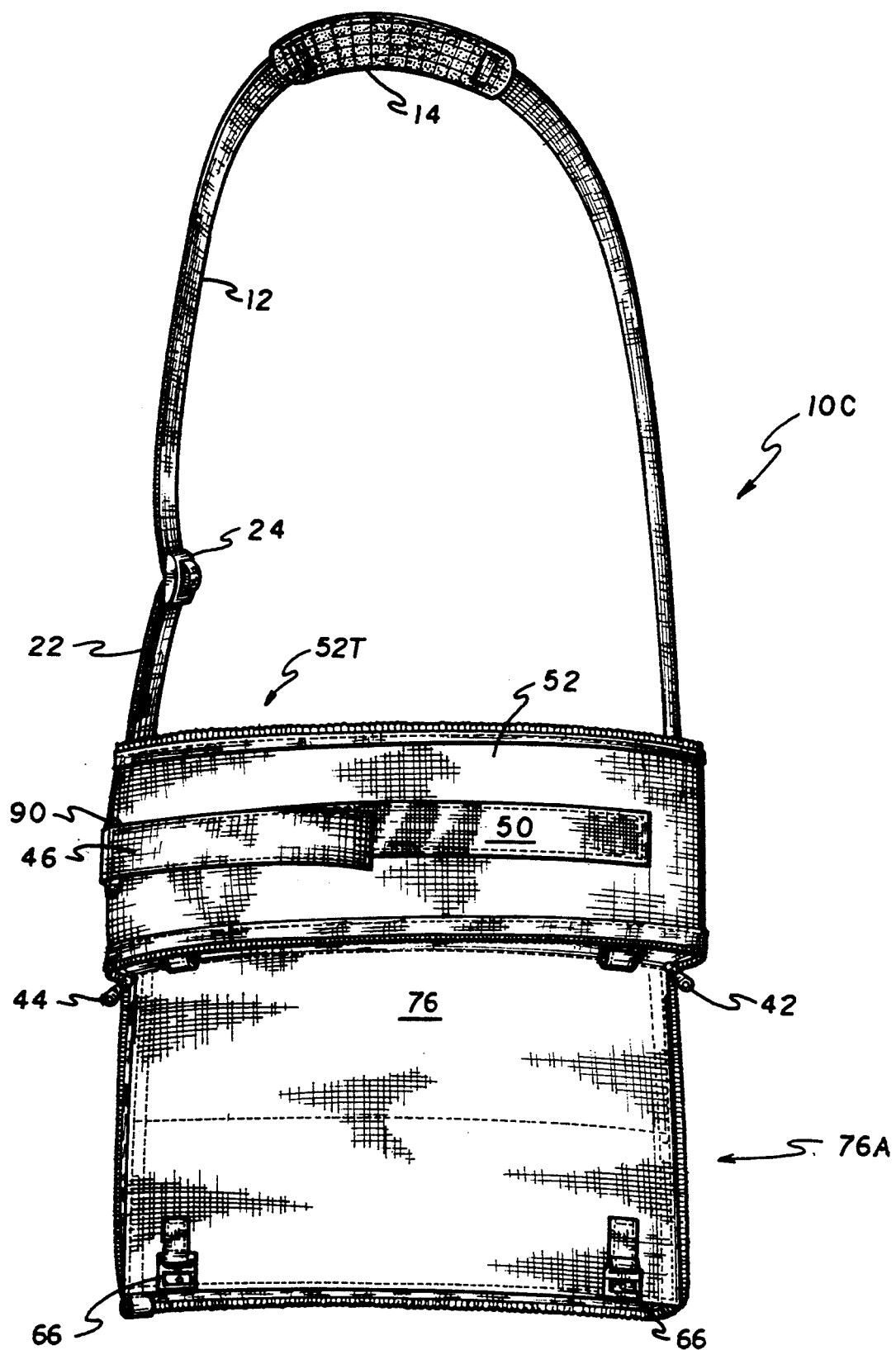
FIG. 6 is a rear elevational view of the apron shown in FIG. 5.

To form an apron 10B,10D having an open end pocket 64P as shown in FIGS. 4,5 and 6, a first rectangular side flap 64 is folded back on itself to releasably engage the female clips 66 and the corresponding male insertions 68 to form the open end pocket 64P.

Figure 2:
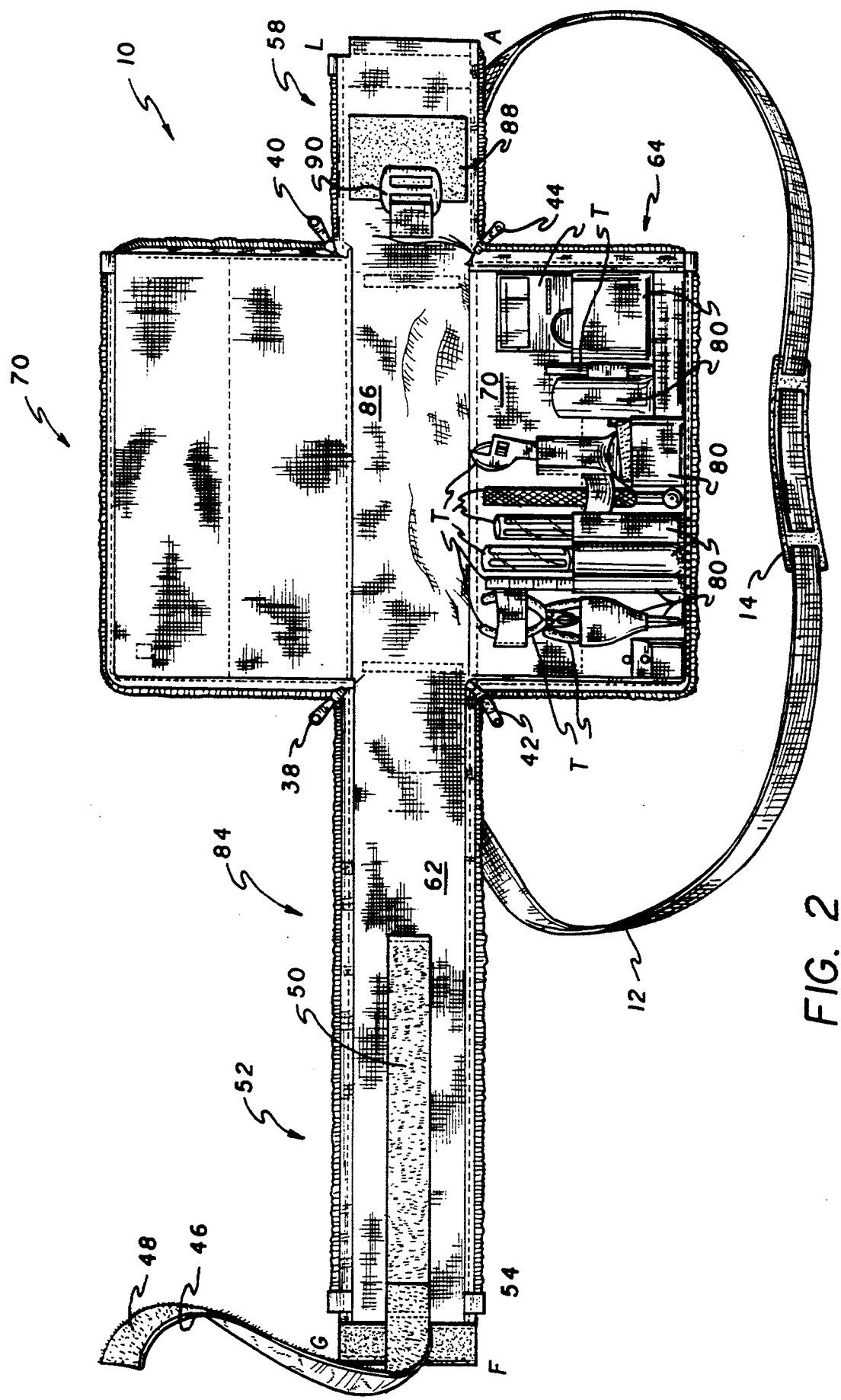
FIG. 2 is a top plan view of the tote bag shown in FIG. 1 in an open position.
Figure 7:
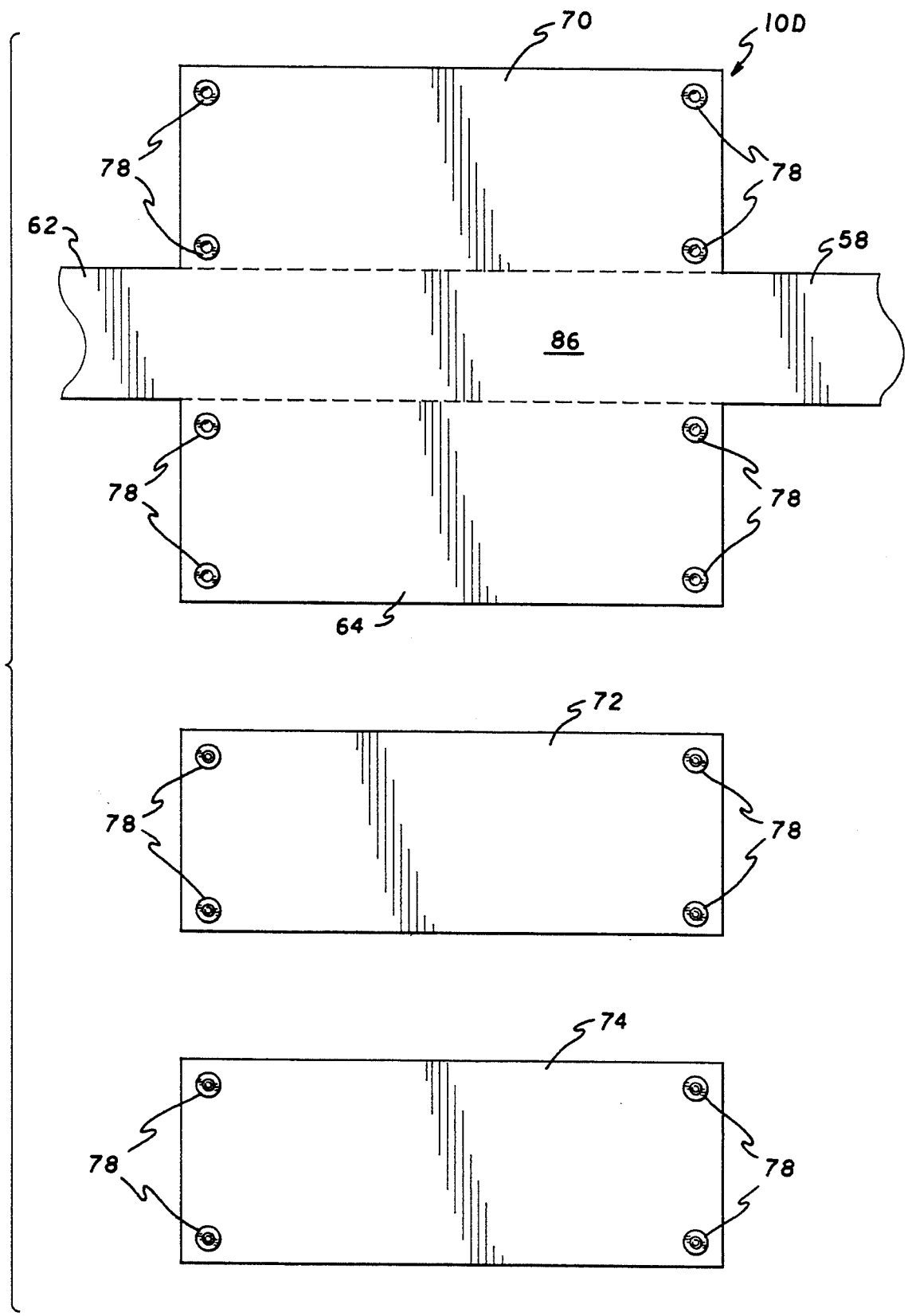
FIG. 7 is a fragmentary top diagrammatical view of the tote bag which accommodates interchangeable panels.

Alternatively, an apron 10B may be formed having one of a plurality of interchangeable panels 70,72,74 for carrying articles attached thereto. As shown in FIGS. 2 and 7, both the first and second rectangular side flaps 64,76 may bear snap fasteners 78 engagable with mating snap fasteners 78 of the interchangeable panels 70,72,74 for the attachment of the interchangeable panels 70,72,74 to the inner surface of the side flaps 64,76. One such panel 70 is shown, for example, attached to the first side flap 64. This particular panel includes independent securing means 80 (shown in FIG. 2 as loops and pockets for retaining various tools T in an organized arrangement. In addition, another such panel 72 is shown attached to the second side flap 76. Panel 72 is an unornamented panel to be used for the protection of second side flap 76. The other panels 72,74 may be substituted in the place of panel 70 depending on the articles intended to be carried.

FIGS. 4,5 and 6 show the article carrier 10 in the form of an apron 10B,10C having the open end pocket 64P formed from the first rectangular side flap 64 and the therapeutic back support 52T formed from the lid flap 52. To obtain this configuration, the elongated belt-like portion of the convertible article carrier 40 (consisting of the lid flap 52, the rear rectangular flap 84, the bottom portion 86, and the front rectangular flap 58 forming the tote bag 10A) bounded by points AFGL is worn around the waist of the user with the lid flap 52, which forms the therapeutic back support 52, coming to rest at the lower back of the user. When worn in this manner, the open end pocket 64P falls and hangs over the second rectangular side flap 76 which forms the apron 76A. The broad rectangular hook portion 54 of the second hook and loop-type fastener disposed along the edge FG of the lid flap 52 is engagable with a cooperating loop portion 88 disposed interiorly of the front rectangular flap 58 completing the belt-loop configuration worn around the torso of the wearer. The hook portion 48 of the belt strip 46 is now unfastened from its initial position hooked to the loop strip 50, inserted into and through the double-D buckle 90, and folded back against itself to be reattached to the loop strip 50. As shown specifically in FIGS. 5 and 6, the shoulder strap 12 may be worn around the neck and employed as a supplemental support for the apron 76A and the open end pocket 64P.

While it will be apparent that the preferred embodiment of the invention herein disclosed is well calculated to fulfill the objects above-stated, it will be appreciated that the invention is susceptible to modification, variation and change without departing from the proper scope or fair meaning of the subjoined claims.

I claim:

1. An article carrier of flexible material which may be selectively convertible to a multipurpose tote bag and an article carrying apron having a therapeutic belt for encircling a torso of a user, said article carrier comprising:

a substantially flat piece of flexible material having a cross-like configuration and attachment means, whereby said cross-like piece of flexible material and attachment means may be so arranged as to alternatively form a multipurpose tote bag and a user encircling apron;

said cross-like piece of flexible material having an elongate, rectangular sheet of material that forms a narrow bottom panel of said tote bag, said bottom panel being integrally formed with a front rectangular panel, a rear rectangular panel, a first side panel, a second side panel and a rectangular lid panel, whereby said front rectangular panel, said rear rectangular panel, said first side panel, said second side panel and said rectangular lid panel are all closeable to close said tote bag;

said first and second side panels each extending in opposing directions horizontally and vertically suitable distances from said bottom panel to form opposed sides of said tote bag;

said rectangular lid panel being formed integrally with said rear rectangular panel;

said front rectangular panel and said rear rectangular panel extending in opposing directions from said bottom panel so as to form a first integral corner located at a junction of said front rectangular panel with said first side panel and said bottom panel, a second integral corner located at a junction of said front rectangular panel with said second side panel and said bottom panel, a third integral corner located at a junction of said rear rectangular panel with said first side panel and said bottom panel, and a fourth integral corner located at a junction of said rear rectangular panel with said second side panel and said bottom panel;

said rectangular lid panel having two longitudinal edges;

said rectangular lid panel including a stiff padded panel;

said front rectangular panel and said first side panel together having a first slidable fastener with an associated pull tab;

said first slidable fastener starting from said first integral corner extending vertically away from said bottom panel and continuing along a first longitudinal edge of said first side panel and a first longitudinal edge of said front rectangular panel, whereby when said pull tab of said first slidable fastener is pulled along the length of said first slidable fastener, said first longitudinal edge of said first side panel is detachably attached to said first longitudinal edge of said front rectangular panel when said article carrier is formed as a tote bag;

said second side panel and said front rectangular panel together having a second slidable fastener with an associated pull tab;

said second slidable fastener starting from said second integral corner extending vertically away from said bottom panel and continuing along a first longitudinal edge of said second side panel and a second longitudinal edge of said front rectangular panel, whereby when said pull tab of said second slidable fastener is pulled along the length of said second slidable fastener, said first longitudinal edge of said second side panel is detachably attached to said second longitudinal edge of said front rectangular panel when said article carrier is formed as a tote bag;

said rectangular lid panel, said first side panel and said rear rectangular panel together having a third slidable fastener with an associated pull tab;

said third slidable fastener starting from said third integral corner extending vertically away from said bottom panel and continuing along a first longitudinal edge of said rear rectangular panel, a first one of said two longitudinal edges of said rectangular lid panel, a second longitudinal edge of said first side panel and an upper longitudinal edge of said first side panel, whereby when said pull tab of said third slidable fastener is pulled along the length of said third slidable fastener, said first longitudinal edge of said rear rectangular panel is detachably attached to said second longitudinal edge of said first side panel and said first one of said two longitudinal edges of said rectangular lid panel is detachably attached to said upper longitudinal edge of said first side panel when said article carrier is formed as a tote bag;

said second side panel, said rectangular lid panel and said rear rectangular panel together having a fourth slidable fastener with an associated pull tab; and said fourth slidable fastener starting from said fourth integral corner extending vertically away from said bottom panel and continuing along a second longitudinal edge of said second side panel, a second one of said two longitudinal edges of said rectangular lid panel, an upper longitudinal edge of said second side panel and a second longitudinal edge of said rear rectangular panel, whereby when said pull tab of said fourth slidable fastener is pulled along the length of said fourth slidable fastener, said second longitudinal edge of said second side panel is detachably attached to said second longitudinal edge of said rear rectangular panel and said second one of said two longitudinal edges of said rectangular lid panel is detachably attached to said upper longitudinal edge of said second side panel when said article carrier is formed as a tote bag.

2. An article carrier as recited in claim 1, further comprising a carrying means formed by an adjustable shoulder strap attached to said article carrier.

3. An article carrier as recited in claim 2, wherein said adjustable shoulder strap is provided with a slidable padding.

4. An article carrier as recited in claim 3, wherein said shoulder strap is releasably tethered to two buckles, each buckle being permanently secured to a respective one of said front and rear rectangular panels.

5. An article carrier as recited in claim 2, wherein said article carrier when formed as a tote bag includes internal means for securing articles in an organized arrangement in segregated compartments.

6. An article carrier as recited in claim 5, wherein said internal means for independently securing articles comprises loops and pockets, structured in a manner to prevent accidental detachment of the articles.

7. An article carrier as recited in claim 1, wherein said slidable fasteners constitute means for converting said tote bag into an article carrying apron.

8. An article carrier as recited in claim 7, wherein said apron includes a belt-like configuration for wearing around a user's waist.

9. An article carrier as recited in claim 8, wherein said belt-like configuration includes said stiff, padded, rectangular lid panel, functioning as a therapeutic back support.

10. An article carrier as recited in claim 9, further comprising an open end pocket consisting of said rear rectangular panel.

11. An article carrier as recited in claim 10, further including a first hook and loop type fastener having a first elongated hook portion disposed along a longitudinal central axis interiorly of said rectangular lid panel and an elongated, belt-like corresponding strip of a first loop portion, whereby said first loop portion cooperatively engages said first hook portion to facilitate operation as an auxiliary tightening means to secure said article carrier when formed as an apron around a user's waist.

12. An article carrier as recited in claim 11, further comprising a buckle disposed on said front rectangular panel and adjacent to said bottom panel, said buckle having an opening, which is provided to receive said elongated belt-like corresponding strip enabling said elongated belt-like corresponding strip to form a loop around said buckle, whereby after said loop is formed, said second loop portion comes into registry with said second hook portion to secure said entire apron assembly around a user's waist.

13. An article carrier as recited in claim 1, wherein said stiff padded panel comprises a layer of stiff, rubber-like substance disposed between an external and internal material layer of said lid panel to provide necessary firmness for a therapeutic back-support device.

* * * * *